July 16, 1968 R. ROBERTS 3,392,883
CARTRIDGE-TYPE DUSTING DEVICE
Filed Nov. 28, 1966
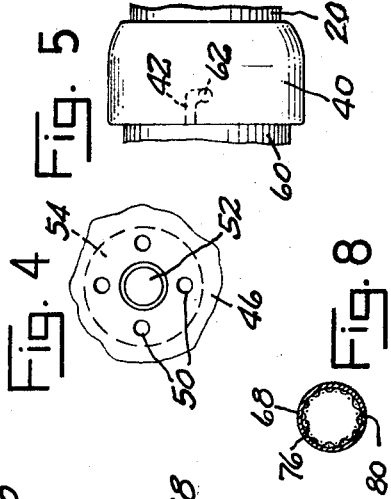
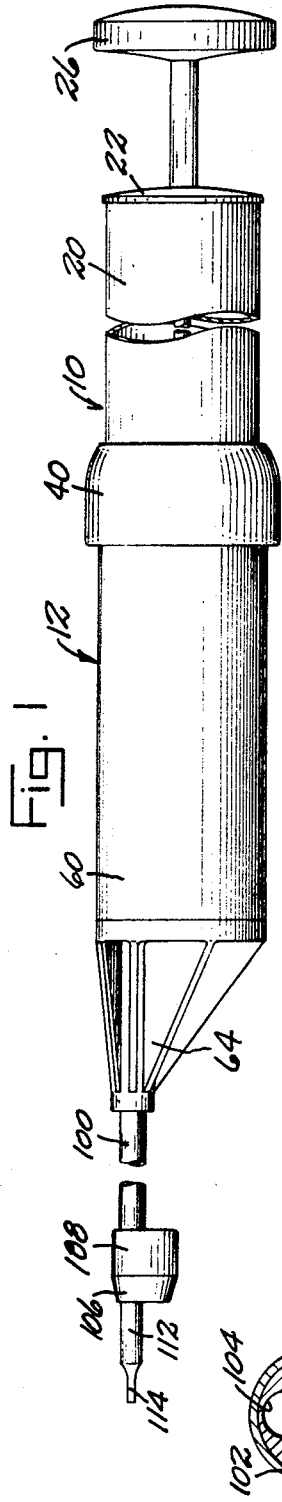
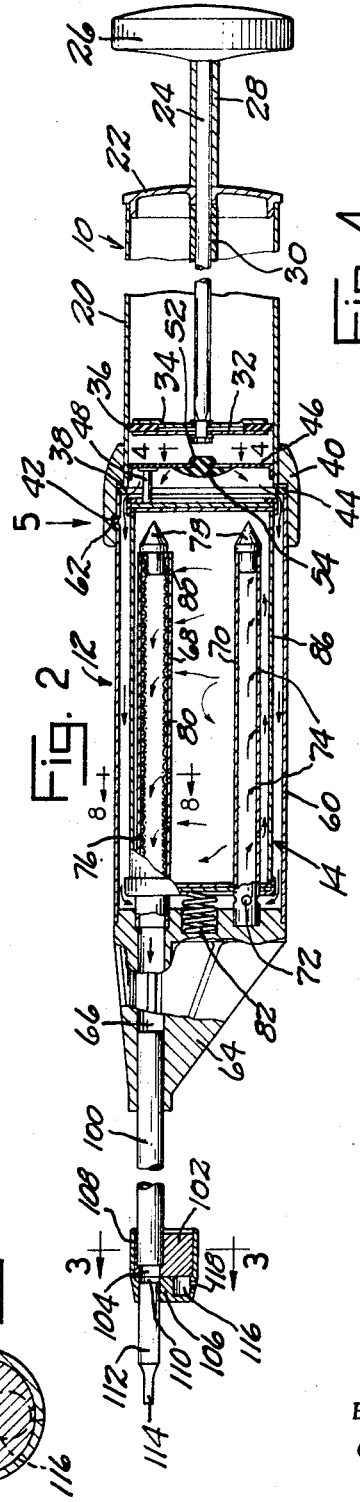
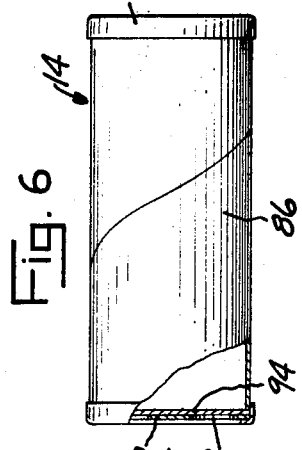
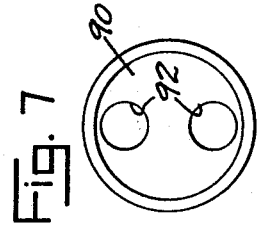
INVENTOR.
ROGER ROBERTS
BY Eugene C. Knoblock
ATTORNEY

United States Patent Office 3,392,883
Patented July 16, 1968

3,392,883
CARTRIDGE-TYPE DUSTING DEVICE
Roger Roberts, Lowell, Mich., assignor to Root-Lowell Manufacturing Company, Lowell, Mich., a corporation of Ohio
Filed Nov. 28, 1966, Ser. No. 597,351
12 Claims. (Cl. 222—86)

ABSTRACT OF THE DISCLOSURE

The disclosed device is a cartridge-type dusting dispenser. It consists of an air pump detachably coupled to a housing which receives a cartridge of the dust-like material which is to be dispensed. The forward end of the housing mounts a forwardly extending discharge nozzle and two rearwardly extending air flow tubes with pointed ends. In assembled condition, the two air flow tubes are disposed within the dust cartridge and the air pump is coupled to the housing. Air pressure created in the housing enters one of the air flow tubes through an opening located between the front end of the housing and the front end of the cartridge. Within the cartridge the flowing air leaves the tube through openings along its length and, along with the entrained dust, enters the other tube, from which it passes to the discharge nozzle.

---

This invention relates to improvements in cartridge-type dusting devices used for the dispensing or application of insecticides, pesticides or other chemicals of the dust type or powdered type.

While dusts, to be applied by plunger type dusting equipment for chemical control of insects, pests and plant diseases, are commonly packaged and marketed in bags or containers, there have been dusting devices produced employing an original container or a cartridge as the dust reservoir, which cartridge is used by mounting it in a device including a pump for generation of air pressure or air currents directed through the cartridge to entrain the dust and discharge it to atmosphere. Some problems have occurred heretofore in the use of devices of the latter character, including inability to secure uniform mixture of the dust in an air stream, inability to completely exhaust or discharge all of the dust in a cartridge or container, and difficulty in applying and removing the cartridge or container. Other problems have entailed the inability to remove a cartridge from the prior device when only partly exhausted and without loss of the remaining contents, for the purpose of interchanging cartridges containing different types of chemical dust.

It is the primary object of this invention to provide a novel, simple, and inexpensive device which will overcome the foregoing disadvantages in prior devices.

A further object is to provide a device of this character which provides a novel path of air flow from an air pump or other air flow generator to and through a dust cartridge for discharge of a uniform mixture of dust and air.

A further object is to provide a device of this character having two air flow tubes serving to penetrate a dust cartridge and so located and arranged that air enters the cartridge through restricted openings along the length of and at the bottom of the lowermost tube, and passes through the cartridge to openings in a discharge tube located adjacent the upper part of the cartridge in a manner to insure that all dust in the container is subjected to the action of the air flow through the cartridge for entrainment and discharge of all dust from the cartridge.

A further object is to provide a device of this character which is constructed to pierce and releasably mount a dust cartridge having spaced tube receiving openings spanned by a penetrable film and from which a cartridge is readily removable while partially filled without a substantial loss of dust content therefrom.

A further object is to provide a device of this character having a novel means for controlling the direction of discharge of the dust therefrom.

Other objects will be apparent from the following specification.

In the drawing:

FIG. 1 is a view of the device in side elevation with parts broken away.

FIG. 2 is a longitudinal sectional view of the device.

FIG. 3 is a sectional view taken on line 3—3 of FIG. 2.

FIG. 4 is a fragmentary view taken on line 4—4 of FIG. 2.

FIG. 5 is a fragmentary side view of the device.

FIG. 6 is a side view of a cartridge with parts shown in section.

FIG. 7 is an end view of the cartridge viewed in the direction of the arrow in FIG. 6.

FIG. 8 is a sectional view of the discharge tube taken on line 8—8 of FIG. 2.

Referring to the drawing which illustrates the preferred embodiment of the invention, the numeral 10 designates an air pump or other air flow generater to which is releasably connected a chamber member 12 adapted to releasably receive a dust cartridge 14 and having a dust discharge passage.

The air flow generator 10 may be of any type found suitable and as here shown is of the hand operated plunger or piston air pump type having a pump cylinder 20 mounting a pump plug or end cap 22 at one end apertured centrally to slidably receive a plunger rod 24 mounting a handle 26 at its outer end. The stroke of the pump rod is preferably controlled by an outer bump tube 28 and an inner bump tube 30 slidably encircling the plunger rod at opposite sides of the pump plug 22. The plunger rod mounts a piston at its free or inner end, which piston preferably consists of retainer plate 32, back washer 34, and a plunger ring 36 clamped between the plate 32 and the washer 34 and having frictional engagement with the inner surface of the pump cylinder.

The end of the cylinder 20 opposite that which mounts the pump plug 22 preferably has an outturned annular flange 38, and is encircled by a locking ring 40 having an internal shoulder engaging the flange 38. The locking ring 40 projects beyond the end of the pump cylinder 20 and has one or more internal bayonet type slots or grooves 42 therein at a part projecting beyond the flange 38. An annular gasket 44 fits in the locking ring 40 and bears against the flange 38. Spaced inwardly from the transverse plane of the flange 38, is a partition disc 46 mounted fixedly in the pump cylinder 20 and carrying a positioning pin 48 extending longitudinally of the pump cylinder in eccentric relation and extending outwardly toward the open end of the pump cylinder. The partition 46 has apertures therein at 50 spaced from the center thereof and has a central aperture which receives a projecting button 52 of a resilient valve disc 54 whose margins overlie the aperture 50 and bear against the outer face of the partition 46. It will be understood that the pump is of the conventional type in which air is drawn into the chamber between the piston 32-36 and the partition disc 46 upon the outward stroke of the piston 32, and is discharged through the apertures 50 upon the return stroke of the piston, that is the stroke from right to left as seen in FIG. 2. The bump tubes 28 and 30 serve to limit the stroke of the piston within the cylinder 20.

The chamber member 12 constitutes a tubular member or cylinder 60 of diameter to have a snug rotative fit within the projecting part of the locking ring 40. Tube 60 has one or more projections or protuberances 62 adjacent one end thereof and adapted to fit within the bayonet slot or groove 42 of ring 40 to affect an interlock and firm connection of the tube 60 with the locking ring 40 and the pump cylinder 20 characterized by an abutment of the tube 60 with the gasket 44. At its opposite end, the tube 60 mounts a closure or nose cap 64 which preferably constitutes a finned casting and which has a shouldered circular end portion encircled by and mounting fixedly the end of the tube 60. The nose cap 64 has a discharge passage 66 therein extending longitudinally thereof in off-center relation.

A longitudinal upper dust outlet tube 68 is fixedly carried by the nose cap 64 in concentric relation with the discharge passage 66 and extends parallel to the axis of the tube 60. An inlet air tube 70 is carried by the nose cap 64 spaced from the tube 68 and extends parallel to the longitudinal axis of the tube 60 and the tube 68. and preferably is located adjacent the lower part of the tube 60 in normal use position. Each of the tubes 68 and 70 mounts a pointed piercing end member 78 whose tip is positioned inwardly from the plane of the end of the tube 60 which is mounted and retained within the locking ring 40.

The air inlet tube 70, which is positioned lowermost during use, as illustrated in FIG. 2, is provided with one or more air intake ports or openings 72 located adjacent to the inner face of the nose cap 64. Inlet air tube 70 also is provided with a plurality of restricted discharge apertures spaced lengthwise thereof and formed in the portion thereof which is lowermost during use so as to discharge air therefrom in a downward direction. The dust outlet tube 68 has a snug fitting tubular screen 76 therein which is preferably carried by the pointed end member or tip 78 of the tube. The dust outlet tube 68 has a plurality of longitudinally spaced air intake apertures 80 formed therein in substantially uniformly spaced relation and preferably located in the lowermost portion thereof in use. Apertures 80 may be larger than apertures 74 in tube 70.

The nose cap 64 peferably has a socket in the inner face thereof at or adjacent the center thereof in which is mounted a coil spring 82 which projects from the socket into the chamber tube 60 a distance greater than the spacing of the air intake ports 72 of the intake tube 70 from the inner face of the nose cap 64.

The dust cartridge 14 constitutes a tubular body 86 having an end closure 88 at one end and an end closure 90 at its opposite end. End closure 90 is preferably provided with a pair of spaced holes 92 whose diameter is greater than the diameter of the tubes 68 and 70 and whose center to center spacing is substantially equal to the center to center spacing of the tubes 68 and 70. Holes 92 are oriented in the same manner as are the tubes 68 and 70 relative to the nose cap 64. A readily penetrable film 94 of plastic or paper spanning holes 92 completes end closure 90.

In assembling the device, the cartridge is held upright with end 90 uppermost and is inserted into chamber 12 with its holes 92 aligned with tubes 68 and 70. The end members 78 of the tubes 68 and 70 pierce the film 94 of the cartridge and provide a snug sliding sealed fit of the leading end of the cartridge around the tubes 68 and 70. The cartridge is advanced in the chamber member 12 until the leading end closure 90 thereof abuts the coil spring 82 at a position spaced from the inner face of the nose cap 64. The assembled chamber member 12 and dust cartridge 14 are then inserted in the locking ring 40 until the end of the chamber tube 60 engages the washer 44. The parts are then interlocked by manipulating or rotating the locking ring 40, it being understood that the protuberances 62 upon the cylinder 40 fit within the bayonet or other locking slots or grooves 42 within the locking ring.

When the parts have been assembled in the manner described above, the device is held in a position with the discharge passage uppermost and the air inlet tube 70 lowermost, as shown in FIG. 2, while the air pump or other air flow generator is operated, as by reciprocating the handle 26. The paths of flow of air which are generated by operation of the air pump are illustrated by the arrows in FIG. 2, wherein it will be observed that the dust cartridge 14 is spaced from the chamber member 12 and the partition 46 of the pump at the sides and ends thereof so that air is free to flow around the cartridge when discharged from the pump apertures 50. The air which flows around the cartridge passes between the nose cap 60 and the front end 90 of the cartridge to enter the air intake port or ports 72 of the tube 70 and thence flows rearwardly within the tube 70. Air is discharged under pressure from tube 70 at the longitudinally spaced apertures 74 in a downward direction and thence flows within the interior of the dust cartridge 14. Air flow within the dust cartridge extends to and through the apertures 80 of the dust outlet tube 68 so that air and entrained dust enters tube 68 at longitudinally spaced points. The air flow through the tubular screen 76 of tube 68 insures against entry of chunks or heavier particles of dust or powder so that the dust being discharged remains in its powdered or dust form. The dust entrained air entering the outlet tube 68 is discharged through the outlet passage 66 into the atmosphere for delivery to the plants, bushes, or shrubs to be treated thereby.

It will be apparent that, since the discharge of air through apertures 74 of the air inlet tube 70 occurs at longitudinally spaced points in downwardly directed jets, the passage of air through the cartridge insures maximum entrainment of dust in the air. Thus, regardless of the quantity of dust in the cartridge, the air will agitate and mix with the dust and entrain the same. Consequently, there is assurance that the entrainment of dust will be substantially uniform during operation and regardless of the amount of dust which is contained within the cartridge. Also, it will be apparent that since the dust will tend to fill the lower part of the container by gravity and since the air currents flowing through the cartridge act to agitate the dust, the dust will be distributed uniformly lengthwise of the cartridge during the operation of the device. This is important to insure that good control of diffused discharge of dust occurs at the start of and throughout the operation of the device. This is in contrast to the operating experience with some of the prior devices which tend to discharge initially a large volume of high concentration of dust, but in which continued operation is characterized by discharge of lesser amounts or concentration of dust, whereby a progressively decreasing concentration or ratio of dust is discharged. These characteristics all result from the arrangement and positioning of the parts of the device and the location of the apertures in the tubes which insures the agitation of the dust within the cartridge.

One of the interesting characteristics of the device is the fact that it permits the substitution of cartridges to use dust of different chemical content interchangeably. Thus, it will be seen that when a given partly filled cartridge is to be removed and a new or different cartridge substituted, the device can be held substantially upright with the chamber member 12 uppermost while the locking ring 40 is manipulated to release the interlock between the chamber member and the pump. As the pump 10 and chamber 12 are separated, the coil spring 82 comes into play to assist in release of the cartridge from the chamber member 12, although the engagement of the film 94 with the tube 68 and 70 provides a frictional retardant to quick release. Also, this contact of the film with the tubes minimizes spillage of the dust incident to the withdrawal. Consequently, by careful manipulation, retaining the cartridge in a substantial vertical position with its end closure 90 uppermost, loss of any substantial amount of the dust from the cartridge can be avoided, and the cartridge can be stored with its pierced end uppermost until reuse is required. If desired, a releasable cap may be provided upon apertured end closure 90 to seal the cartridge against loss of dust and to exclude moisture.

If it is desired to provide directional control of discharge of the air-dust stream from the discharge passage 66, a discharge attachment of the character illustrated in FIGS. 1, 2, and 3 may be employed. This attachment entails the use of an extension tube 100 which has a snug friction fit within the discharge passage 66, and is preferably releasably mounted. A circular swivel nozzle body 102 is mounted upon the free end of the extension tube 100 in eccentric relation and has a bore 104 which extends therethrough. A cup-shaped swivel nozzle shell fits around the nozzle body 102 and has a base or end wall 106 and a tubular part 108 encircling and rotatable upon the body 102. The base 106 has a passage 110 therethrough adapted to be aligned with and to communicate with the passage 104 and the extension tube 100 in one rotative position, as illustrated in FIG. 2. Passage 110 preferably mounts a tubular dusting tip 112 which preferably has a flattened discharge end 114. The base 106 of the swivel nozzle shell also has a recess 116 in its inner face positioned to align with the passage 104 and the extension tube 100 when in a second rotative position. A discharge aperture 118 extends laterally or transversely from the recess 116 to discharge dust in a substantially radial direction. It will be apparent that the swivel nozzle shell may be rotated to bring into registry with the passage of the nozzle body 102, a selected one of the discharge passages 110 and 116, 118, to thereby readily control the direction of air-dust discharge, as between a longitudinal discharge as provided in the position shown in FIG. 2 and a lateral or radial discharge when the swivel nozzle shell has been rotated to bring the recess 116 into register with the passage 104.

While the preferred embodiment of the invention has been illustrated and described, it will be understood that changes in the construction may be made within the scope of the appended claims without departing from the spirit of the invention.

I claim:

1. A dusting device comprising a chamber having a closure at one end with a discharge passage and means detachably connecting the opposite end to an air flow producing device, a pair of parallel longitudinal tubes in said chamber carried by said closure and each having a pointed closure tip, and a dust cartridge fitting in said chamber with clearance and having an end perforated by said tips whereby said cartridge is supported by and receives parts of said tubes, one of said tubes having an air intake opening therein between said chamber closure and said cartridge and a plurality of longitudinally spaced discharge openings in the tube portion within said cartridge, and the other tube communicating with said discharge passage and having a plurality of longitudinally spaced openings in the tube portion within said cartridge.

2. A dusting device as defined in claim 1, wherein said tubes are arranged in vertically spaced relation with the spaced openings of said first tube being formed in the lowermost part thereof.

3. A dusting device as defined in claim 1, wherein said tubes are arranged in vertically spaced relation and the spaced apertures of both tubes are formed in the bottom parts thereof.

4. A dusting device as defined in claim 1, and means for positioning said cartridge longitudinally in said chamber for air flow past both ends thereof.

5. A dusting device as defined in claim 1, and a spring carried by said chamber closure and engaging and flexed by said cartridge in the operative position of the parts.

6. A dusting device as defined in claim 1, wherein the spaced openings in said first tube are of smaller size than the openings in said other tube.

7. A dusting device as defined in claim 1, wherein a tubular screen lines the interior of said second tube.

8. A dusting device as defined in claim 1, wherein said air flow producing device comprises a hand pump having an open ended pump cylinder, and said detachable connecting means comprises a ring carried by said cylinder and embracing an open end of said chamber and releasably interfitting parts on said ring and chamber.

9. A dusting device as defined in claim 1, wherein said air flow producing device comprises a hand pump having an open ended cylinder carrying a locking ring in which said chamber is releasably interlocked and an abutment engaging and positioning the adjacent end of said cartridge.

10. A dusting device as defined in claim 1, and a tube connected to said discharge passage, and a swivel nozzle carried by said tube and including spaced outlet openings discharging in different directions and selectively communicating with said tube.

11. A dusting device as defined in claim 1, and means for controlling the direction of discharge of dust laden air and comprising a circular nozzle body having a passage extending therethrough eccentrically thereof, and a cup-shaped nozzle shell rotatable on said body and having spaced angularly directed outlets selectively registering with said body passage.

12. A dusting device comprising a tubular member having a closure at one end interrupted by a discharge passage, an air pump, means providing a releasable sealed connection between the air pump and the open end of said tubular member, a pair of tubes carried by said closure and extending parallel to each other and to said tubular member within said tubular member, said tubes each having a pointed closure tip terminating within said tubular member, a dust cartridge fitting in said tubular member and having a readily penetrable end, said cartridge being adapted for releasable insertion into said tubular member by endwise movement to cause penetration of its penetrable end by said tubes and positioning of portions of said tubes in said cartridge, and cartridge positioning means engaging the opposite ends of said cartridge and carried by said closure and pump respectively, one tube having an inlet opening therein between said closure and said cartridge and a plurality of longitudinally spaced openings in the portion thereof within said cartridge, the other tube communicating with said discharge passage and having a plurality of longitudinally spaced openings in the portion thereof within said cartridge, said tubes and positioning means positioning said cartridge in said tubular member with clearance for free flow of air from said pump around said cartridge to said inlet opening.

References Cited

UNITED STATES PATENTS

| 1,406,904 | 2/1922 | Rose | 222—193 X |
| 1,527,491 | 2/1925 | Rose | 222—193 |
| 1,877,778 | 9/1932 | Tappan | 222—193 |
| 2,202,079 | 5/1940 | Ayres | 222—193 |

ROBERT B. REEVES, *Primary Examiner.*

F. R. HANDREN, *Assistant Examiner.*